United States Patent
Kichise et al.

(10) Patent No.: US 8,112,015 B2
(45) Date of Patent: Feb. 7, 2012

(54) BELT UNIT AND IMAGE FORMING APPARATUS

(75) Inventors: Mitsutoshi Kichise, Osaka (JP); Tomofumi Inoue, Osaka (JP); Takeshi Sakashita, Osaka (JP); Takeru Muramatsu, Ibaraki (JP); Yuuji Meguro, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 858 days.

(21) Appl. No.: 12/142,354

(22) Filed: Jun. 19, 2008

(65) Prior Publication Data

US 2009/0011882 A1    Jan. 8, 2009

(30) Foreign Application Priority Data

Jul. 3, 2007    (JP) .................. 2007-174743

(51) Int. Cl.
   *G03G 15/00*    (2006.01)
   *G03G 15/16*    (2006.01)

(52) U.S. Cl. ........ 399/162; 399/159; 399/302; 399/303; 474/179

(58) Field of Classification Search .................. 399/107, 399/110, 162, 159, 302, 303, 308, 313, 328, 399/329; 492/47; 474/179
See application file for complete search history.

(56) References Cited

U.S. PATENT DOCUMENTS

| | | | | |
|---|---|---|---|---|
| 5,768,943 A * | 6/1998 | Kawata et al. | ............ | 399/159 X |
| 7,050,738 B2 * | 5/2006 | Amanai | ..................... | 399/159 X |
| 7,058,345 B2 * | 6/2006 | Abe et al. | ..................... | 399/303 |
| 7,735,634 B2 | 6/2010 | Miyazaki et al. | | |
| 2007/0183816 A1 | 8/2007 | Hatayama et al. | ............ | 399/299 |
| 2007/0269233 A1 | 11/2007 | Sakashita et al. | ............ | 399/110 |
| 2008/0003022 A1 | 1/2008 | Sakashita et al. | ............ | 399/303 |
| 2008/0028967 A1 | 2/2008 | Sakashita et al. | ............ | 101/479 |
| 2008/0050158 A1 | 2/2008 | Hatayama et al. | ............ | 399/358 |
| 2008/0317521 A1 | 12/2008 | Inoue et al. | | |
| 2009/0016772 A1 | 1/2009 | Adachi et al. | | |

FOREIGN PATENT DOCUMENTS

| | | |
|---|---|---|
| JP | 59-126241 U | 8/1984 |
| JP | 9-258636 | 10/1997 |
| JP | 10-10823 | 1/1998 |
| JP | 2000-155480 | 6/2000 |
| JP | 3402896 B2 | 2/2003 |
| JP | 2003-149951 | 5/2003 |
| JP | 4051173 B2 | 12/2007 |

OTHER PUBLICATIONS

Machine translation of JP 2002-014570 A (JP 4051173 (B2)) dated Jun. 21, 2011.*

Office Action issued Oct. 25, 2011 in Japanese Patent Application 2007-174743 filed Jul. 3, 2007.

* cited by examiner

*Primary Examiner* — Sophia S Chen (74) *Attorney, Agent, or Firm* — Oblon, Spivak, McClelland, Maier & Neustadt, L.L.P.

(57) ABSTRACT

At least one of a plurality of rollers supporting an endless belt includes a flange arranged on an end portion of the roller. The flange includes a cylindrical portion that is inserted into an opening portion of the roller at its end. Outer circumference of the cylindrical portion makes contact with inner circumference of the roller, and inner circumference of the flange makes contact with a rotation shaft of the roller. The inner edge of a surface where the flange is in contact with the rotation shaft is located on the inner side of the outer edge of a surface where the cylindrical portion is in contact with the roller in the longitudinal direction of the rotation shaft.

18 Claims, 8 Drawing Sheets

BELT UNIT AND IMAGE FORMING APPARATUS

CROSS-REFERENCE TO RELATED APPLICATIONS

The present application claims priority to and incorporates by reference the entire contents of Japanese priority document 2007-174743 filed in Japan on Jul. 3, 2007.

BACKGROUND OF THE INVENTION

1. Field of the Invention

The present invention relates to a belt unit and an image forming apparatus.

2. Description of the Related Art

A belt used in a belt unit of image forming apparatuses sometimes drifts. For controlling and preventing such belt drifting, various technologies are developed. For example, Japanese Patent No. 3402896 discloses a conventional technology for preventing a drifting of a conveyor belt in a thrust direction by using flanges. Specifically, the flanges having outer diameters larger than that of a driven roller around which the conveyor belt is extended are arranged on both ends of the driven roller such that the conveyor belt is sandwiched by the flanges. Therefore, the drifting of the conveyor belt in the thrust direction can be prevented by the flanges. Furthermore, Japanese Patent Application Laid-Open No. 2000-155480 discloses another conventional technology for preventing the belt drifting by arranging flanges with springs. Specifically, the flanges are arranged on both ends of a shaft of a driven roller and connected to side plates via springs. The springs apply spring pressure to the flanges in the thrust direction, and thereby the belt drifting can be prevented.

However, the flanges in the former conventional technology are formed in general circular shapes although they are formed to have the outer diameters larger than that of the driven roller. Therefore, if the conveyor belt drifts during its rotation and side edges of the conveyor belt hit the flanges, the flanges may be removed from the roller. The flange is generally made of resin by injection molding instead of metal for realizing cost reduction and weight reduction. Such a flange can be easily fitted into the roller; however, the flange often causes moment toward a direction away from the conveyor belt, causing the flange to be removed from the roller. Furthermore, with the latter conventional technology, it is necessary to have a space for arranging the springs in the thrust direction. Therefore, it is difficult to reduce a size of the belt unit. Moreover, necessary components increase because of the springs, increasing necessary costs.

Figure 12:
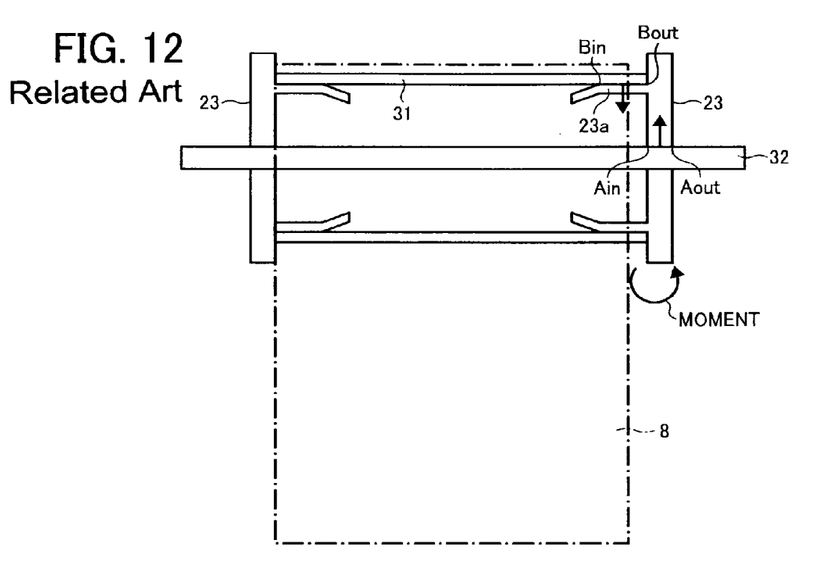
FIG. 12 is a schematic diagram of a conventional belt unit.

Still another conventional technology is known as shown in FIG. 12, which is a cross sectional top view of flanges 23. Specifically, the flanges 23 are arranged on both ends of a roller 31 and each of the flanges 23 includes a pair of cylindrical portions 23a arranged opposite to each other across a rotation shaft 32 (hereinafter, "shaft 32"). An outer periphery of the cylindrical portion 23a is in contact with an inner periphery of the roller 31 thereby the cylindrical portion 23a supports the roller 31. Similarly, an inner periphery of the flange 23 is in contact with the shaft 32 thereby the flange 23 supports the shaft 32. Thus, the flanges 23 can prevent a drifting of a belt 8. However, although the flanges 23 have outer diameters larger than that of the roller 31, their thickness is relatively thin and uniform in a radial direction. Therefore, if the roller 31 is subjected to external force from the belt 8 extended around the roller 31, the flanges 23 may be removed from the roller 31 and thereby side edges of the belt 8 cannot be controlled at a predetermined position.

Figure 13:
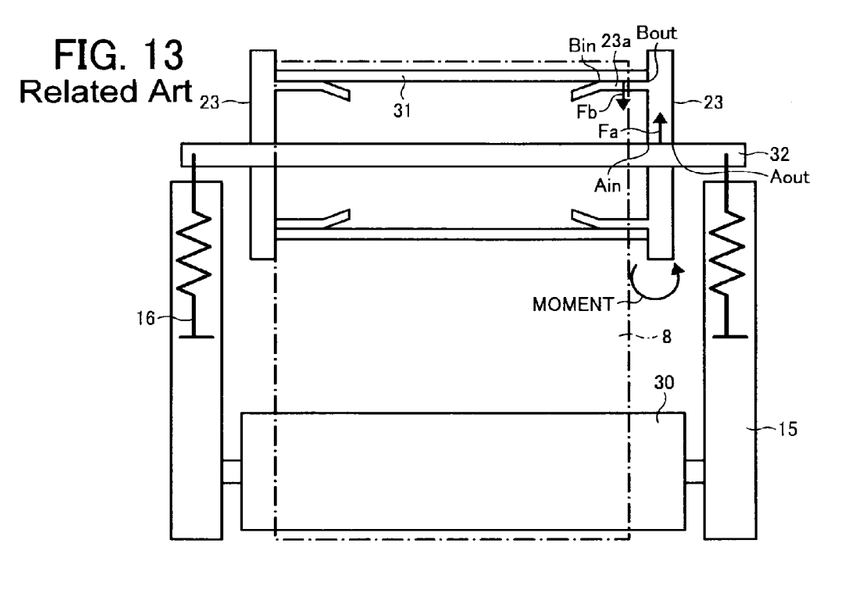
FIG. 13 is a schematic diagram for explaining a state where the belt unit shown in FIG. 12 is mounted on side plates.

More specifically, the flanges 23 are provided by impaction (injection) of the cylindrical portions 23a into the roller 31. As shown in FIG. 13, the roller 31 with the flanges 23 is mounted on a belt unit in an image forming apparatus such that both ends of the shaft 32 of the roller 31 are mounted on side plates 15 via springs 16. The springs 16 apply spring pressure to the shaft 32 to apply tension to the belt 8. With this configuration, a line of action of force Fa does not match a line of action of force Fb. Therefore, moment toward a direction indicated by an arrow in FIG. 13 occurs on the flange 23 and the cylindrical portions 23a. The moment about a point of an outer edge Bout causes force toward a direction along which the flange 23 is removed from the roller 31. When the roller 31 rotates, the force is repeatedly applied as load onto the flange 23, resulting in causing the flange 23 to be removed from the roller 31 at an endurance time. For preventing such removal of the flange 23, it is possible to attach an E ring to the shaft 32 at a position farther from a center position of the shaft 32 than the flange 23 in the thrust direction. However, operations for attaching the E ring are necessary, increasing an operation procedure, and the E ring causes a problem such as friction of a sliding surface between the flange 23 and the E ring.

SUMMARY OF THE INVENTION

It is an object of the present invention to at least partially solve the problems in the conventional technology.

According to an aspect of the present invention, there is provided a belt unit including an endless belt and a plurality of rollers supporting the endless belt. At least one of the rollers includes a flange arranged on an end portion of the roller. The flange includes a cylindrical portion that is inserted into an opening portion of the roller at its end. The outer circumference of the cylindrical portion makes contact with inner circumference of the roller, and the inner circumference of the flange makes contact with a rotation shaft of the roller. The inner edge of a surface where the flange is in contact with the rotation shaft is located on inner side of the outer edge of a surface where the cylindrical portion is in contact with the roller in the longitudinal direction of the rotation shaft.

Furthermore, according to another aspect of the present invention, there is provided an image forming apparatus comprising a belt unit that includes an endless belt and a plurality of rollers supporting the endless belt. At least one of the rollers includes a flange arranged on an end portion of the roller. The flange includes a cylindrical portion that is inserted into an opening portion of the roller at its end. The outer circumference of the cylindrical portion makes contact with inner circumference of the roller, and the inner circumference of the flange makes contact with a rotation shaft of the roller. The inner edge of a surface where the flange is in contact with the rotation shaft is located on inner side of the outer edge of a surface where the cylindrical portion is in contact with the roller in the longitudinal direction of the rotation shaft.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The same reference numerals are assigned to the same components in both the above conventional technologies and the below embodiments.

Figure 1:
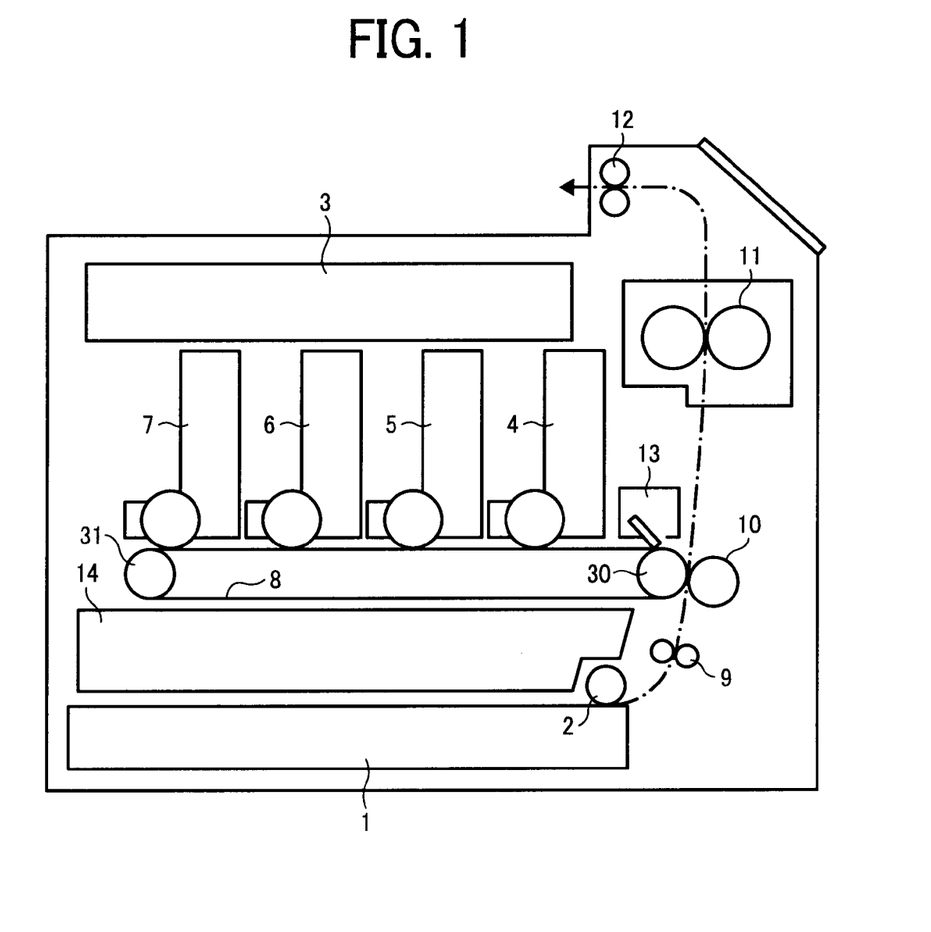
FIG. 1 is a schematic diagram of an image forming apparatus according to an embodiment of the present invention.

FIG. 1 is a schematic diagram of an image forming apparatus according to a first embodiment of the present invention. An exposing unit 3 irradiates image forming units 4, 5, 6, and 7 with a light, so that the image forming units 4, 5, 6, and 7 form color toner images, respectively. The color toner images are sequentially superimposed onto the belt 8 that is an endless belt. A transfer sheet stacked in a sheet cassette 1 is fed by a feed roller 2 and conveyed to a registration roller 9. Then, the toner image is transferred onto the transfer sheet by a secondary transfer roller 10. A fixing unit 11 fixes a transferred image on the transfer sheet, and the transfer sheet is discharged by a discharge roller 12. Thus, an output image is obtained from the image forming apparatus. A residual toner on the belt 8 is removed by a cleaning unit 13. Waste toners removed by the cleaning unit 13 and discharged from the image forming units 4, 5, 6, and 7 are accumulated in a waste toner container 14.

Figure 2:
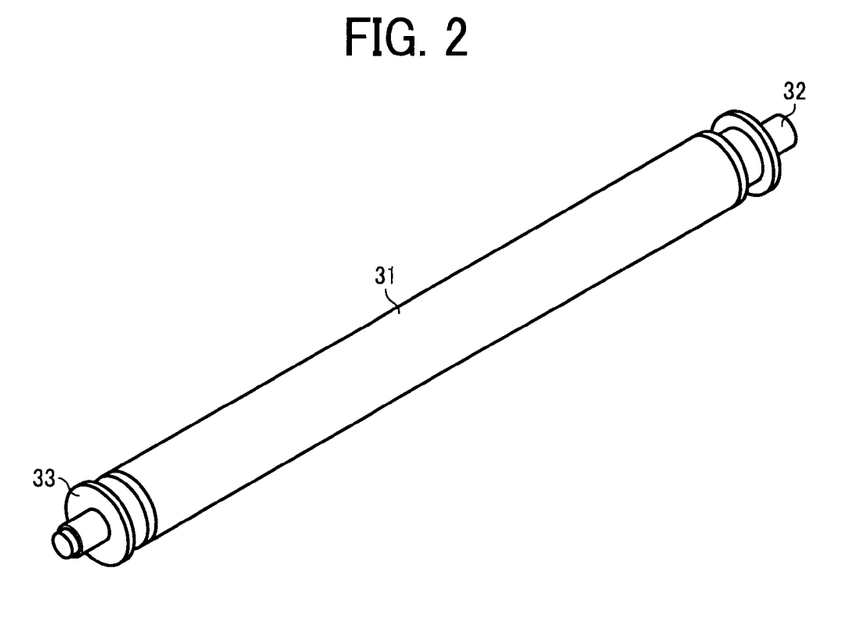
FIG. 2 is a perspective view of a roller in a belt unit shown in FIG. 1.
Figure 3:
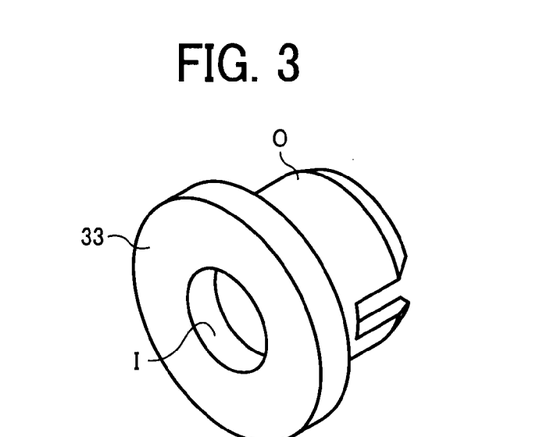
FIG. 3 is a perspective view of a flange to be attached to the roller shown in FIG. 2.

The belt 8 serving as a main component in a belt unit is extended between rollers 30 and 31. FIG. 2 is a perspective view of the roller 31 with the shaft 32 and a flange 33. FIG. 3 is a schematic diagram of the flange 33, in which a reference letter "I" indicates an inner periphery of the flange 33 with which the shaft 32 is supported and a reference letter "O" indicates an outer periphery of the flange 33 with which the roller 31 is supported.

Figure 4:
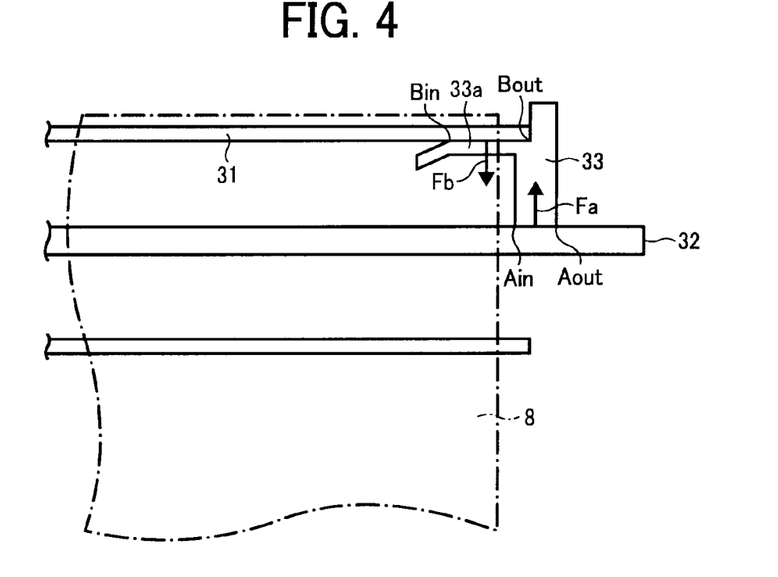
FIG. 4 is a schematic diagram of the flange in a belt unit according to the first embodiment.

The roller 30 is rotated by a driving force from a driving motor (not shown). The shaft 32 supports the roller 31 and a predetermined spring pressure is applied to the shaft 32 by a spring (not shown). The belt 8 is extended between the rollers 30 and 31 with predetermined tension so that the belt 8 rotates along with a rotation of the roller 30. The flange 33 is arranged on each of end portions of the roller 31. FIG. 4 is a schematic diagram of the flange 33 cut in half along the shaft 32. The flange 33 includes a cylindrical portion 33a in an integrated manner. The cylindrical portion 33a is also arranged on other half of the flange 33 (not shown) such that the cylindrical portions 33a face each other across the shaft 32. An outer periphery of the cylindrical portion 33a is in contact with an inner periphery of the roller 31 to support the roller 31. Similarly, the inner periphery of the flange 33 is in contact with the shaft 32 to support the shaft 32.

The flange 33 is configured in such a manner that an outer diameter is larger than an outer diameter of the roller 31 and a radial thickness of a portion on a side of an outer periphery from the cylindrical portion 33a is substantially two-thirds of a radial thickness of a portion on a side of an inner periphery from the cylindrical portion 33a. A radial thickness of the cylindrical portion 33a is set narrower than that of the flange 33 and slightly narrower than that of the roller 31. An inner edge of the cylindrical portion 33a is bent toward the shaft 32 at a predetermined position. In the example shown in FIG. 4, Ain indicates an inner edge of a surface where the inner periphery of the flange 33 is in contact with the shaft 32, Aout indicates an outer edge of the surface where the inner periphery of the flange 33 is in contact with the shaft 32, Bin indicates an inner edge of a surface where the outer periphery of the cylindrical portion 33a is in contact with the roller 31 (a base point from which the cylindrical portion 33a is bent), and Bout indicates an outer edge of the surface where the outer periphery of the cylindrical portion 33a is in contact with the roller 31. As shown in FIG. 4, the Ain is closer to a center position of the shaft 32 in a longitudinal direction than the Bout.

The roller 31 having the above configuration is arranged in the same manner as shown in FIG. 13, in which end portions of the shaft 32 are mounted on side plates via springs. At this state, the cylindrical portion 33a is subjected to force Fb equivalent to a tension of the belt 8 from the outer periphery being in contact with the roller 31 in a direction indicated by an arrow shown in FIG. 4. Furthermore, the flange 33 is subjected to force Fa equivalent to a spring pressure from the inner periphery being in contact with the shaft 32 in a direction opposite to that of Fb. However, because the Ain of the flange 33 is closer to the center position of the shaft 32 in the longitudinal direction than the Bout of the cylindrical portion 33a, a point of action of the Fa from the shaft 32 is also shifted to a position closer to the same center position. As a result, moment caused by the above forces can be reduced. Therefore, the flange 33 is not easily removed from the roller 31. The roller 31 is consistently stabilized at a position where the force Fa and the force Fb are balanced with each other. Thus, it is possible to prevent the flange 33 from being removed from the roller 31 without increasing an operation procedure.

The flange 33 serves as an intermediary between the rotatable roller 31 and the non-rotatable shaft 32, and rotates along with the roller 31. The flange 33 controls drifting of the belt 8 in an axial direction of the roller 31 in the belt unit. Specifically, when the belt 8 drifts in the axial direction of the roller 31, an edge of the belt 8 hits an edge of the flange 33 because the flange 33 has an outer diameter larger than that of the roller 31. Therefore, further drifting of the belt 8 in the axial direction of the roller 31 can be prevented.

Figure 5:
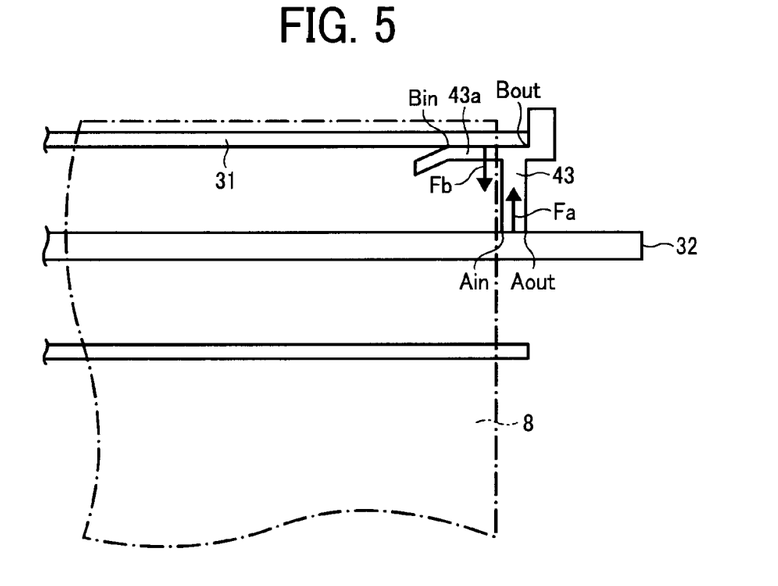
FIG. 5 is a schematic diagram of a flange in a belt unit according to a second embodiment of the present invention.

FIG. 5 is a schematic diagram of a flange 43 in a belt unit according to a second embodiment of the present invention. The flange 43 includes a cylindrical portion 43a and is arranged such that a portion on a side of an outer periphery from the cylindrical portion 43a is further from the center position of the shaft 32 in the longitudinal direction than a portion on a side of an inner periphery from the cylindrical portion 43a. Thus, an inner edge Ain and an outer edge Aout of a surface where the flange 43 is in contact with the shaft 32 are arranged closer to the center position of the shaft 32 in the longitudinal direction than an outer edge Bout of a surface where the cylindrical portion 43a is in contact with the roller 31. Furthermore, the flange 43 and the cylindrical portion 43a are formed with the same thicknesses.

As described above, because the flange 43 is arranged in such a manner that the inner edge Ain and the outer edge Aout are arranged on positions closer to the center position of the shaft 32 in the longitudinal direction than the outer edge Bout, the point of action of the force Fa applied from the shaft 32 is also shifted toward the same center position. Therefore, it is possible to suppress moment caused by the above force. Thus, the flange 43 is not easily removed from the roller 31. Furthermore, it is possible to form the flange 43 with an even thickness.

Figure 6:
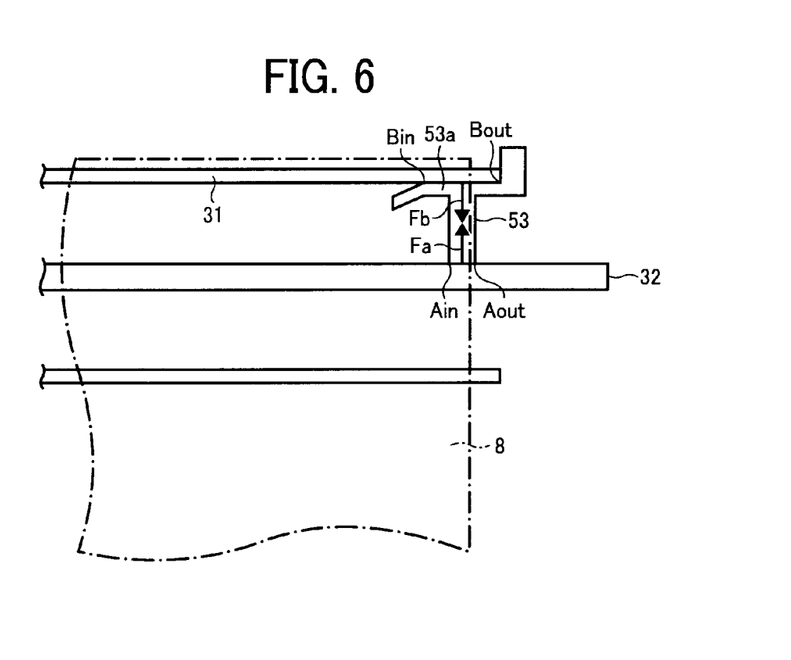
FIG. 6 is a schematic diagram of a flange in a belt unit according to a third embodiment of the present invention.

FIG. 6 is a schematic diagram of a flange 53 in a belt unit according to a third embodiment of the present invention. The flange 53 includes a cylindrical portion 53a and is arranged such that a portion on a side of an outer periphery from the cylindrical portion 53a is much farther from the center position of the shaft 32 in the longitudinal direction than the portion on the side of the outer periphery from the cylindrical portion 43a shown in FIG. 5. Therefore, an outer edge Bout of a surface where an outer periphery of the cylindrical portion 53a is in contact with the roller 31 is farther from the center position of the shaft 32 in the longitudinal direction than an outer edge Aout of a surface where an inner periphery of the flange 53 is in contact with the shaft 32. Furthermore, a center position between an inner edge Ain and the outer edge Aout of a surface where the inner periphery of the flange 53 is in contact with the shaft 32 matches a center position between an inner edge Bin and the outer edge Bout of a surface where the outer periphery of the cylindrical portion 53a is in contact with the roller 31.

As described above, because the center position between the inner edge Ain and the outer edge Aout matches the center position between the inner edge Bin and the outer edge Bout, the point of action of the force Fa applied from the shaft 32 is shifted to a position corresponding to a point of action of the force Fb applied from the roller 31. Therefore, it is possible to eliminate a chance of occurrence of moment. Thus, it is possible to prevent the flange 53 from being removed from the roller 31 at an endurance time. It is also applicable to bond the roller 31 and the cylindrical portion 53a. At this state, it is more assuredly prevent the flange 53 from being removed from the roller 31.

Figure 7:
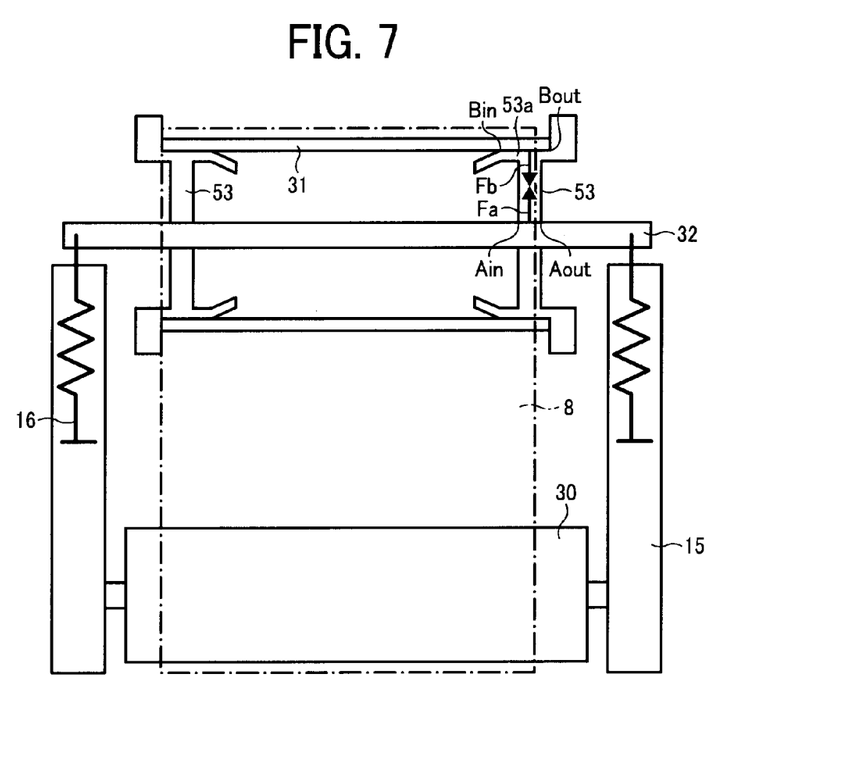
FIG. 7 is a schematic diagram for explaining a state where the belt unit shown in FIG. 6 is mounted on side plates.

FIG. 7 is a schematic diagram for explaining an arrangement of the flange 53 in the belt unit with which moment does not occur. A position of the force Fa applied from the shaft 32 to the flange 53 is adjusted to support the force Fb applied from the belt 8 so that moment in a direction along which the flange 53 is removed from the roller 31 does not occur.

Figure 8A:
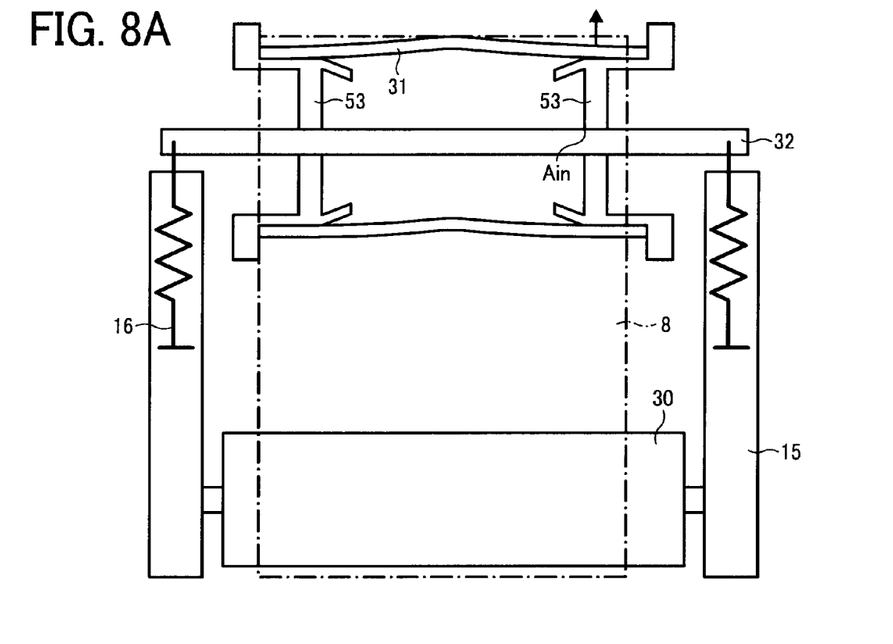
FIGS. 8A and 8B are schematic diagrams for explaining a level of noncontact between side edges of a belt and a roller when the roller is deformed by a force applied from the flange shown in FIG. 6.
Figure 8B:
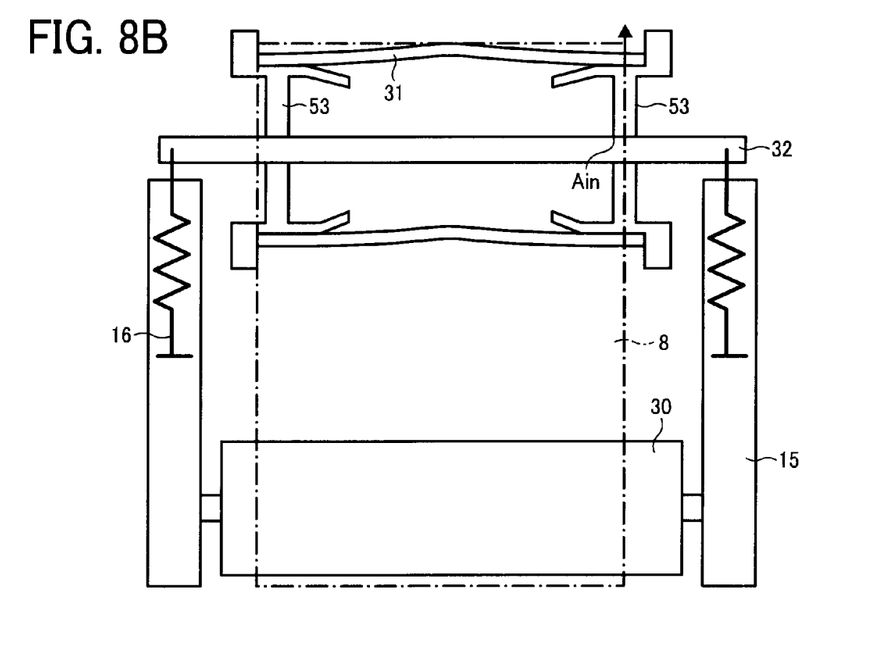

FIGS. 8A and 8B are schematic diagrams of the rollers 31 deformed by a force applied from the flange 53. In the example shown in FIG. 8B, the flange 53 is arranged such that a center position of a surface where the flange 53 is in contact with the shaft 32 corresponds to each of side edges of the belt 8. Therefore, the level of noncontact between the side edges of the belt 8 and the roller 31 can be smaller than that in the example shown in FIG. 8A. Thus, the belt unit shown in FIG. 8B can attain a stable belt rotation.

Figure 9A:
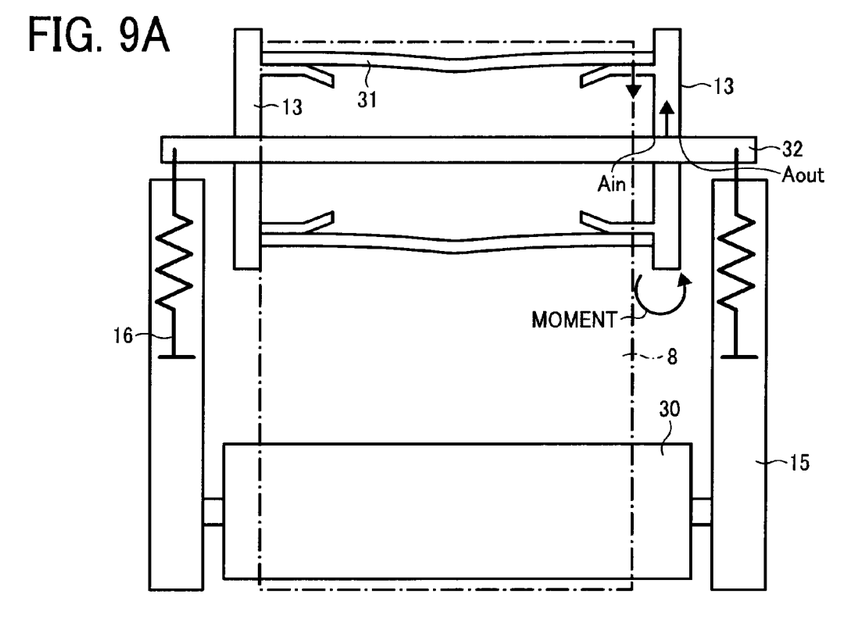
FIGS. 9A and 9B are schematic diagrams for explaining a level of deflection of a roller deformed by a force applied from a belt shown in FIG. 6.
Figure 9B:
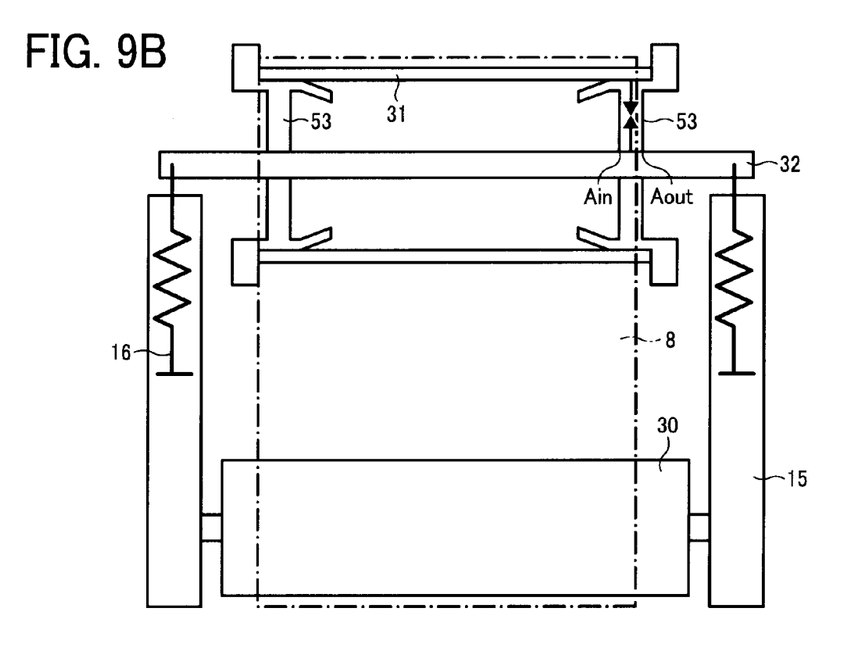

FIGS. 9A and 9B are schematic diagrams of the rollers 31 deformed by a force applied from the belt 8. In the example shown in FIG. 9B, the flange 53 is supported at a position closer to a center position of the shaft 32 in the longitudinal direction than the side edge of the belt 8. Therefore, the belt unit shown in FIG. 9B can suppress the level of deflection of the roller 31 than that in the example shown in FIG. 9A. As a result, the belt unit shown in FIG. 9B can attain a stable belt rotation.

Figure 10:
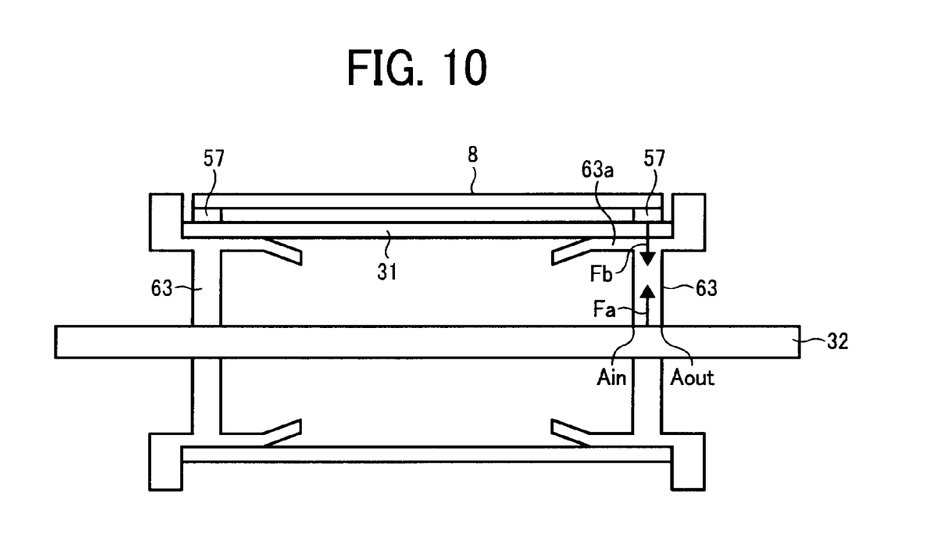
FIG. 10 is a schematic diagram of a flange in a belt unit according to a fourth embodiment of the present invention.

FIG. 10 is a schematic diagram of a flange 63 and a belt unit according to a fourth embodiment of the present invention. A reinforcing tape 57 is attached to a back surface of each of side edges of the belt 8. The flange 63 is arranged in substantially the same manner as those in the first and the second embodiments. Specifically, a center position of an inner edge Ain and an outer edge Aout of a surface where an inner periphery of the flange 63 is in contact with the shaft 32 is within a width of the reinforcing tape 57 in the longitudinal direction of the shaft 32. In the example shown in FIG. 10, the center position matches a center position of the width of the reinforcing tape 57.

As described above, the reinforcing tape 57 is attached to the back surface of each of the side edges of the belt 8, and the flange 63 is arranged such that the center position of the inner edge Ain and the outer edge Aout is within a width of the reinforcing tape 57 in the longitudinal direction of the shaft 32. Therefore, the roller 31 is in contact with the reinforcing tape 57 and the flange 63 can support the force Fb applied from the belt 8 to the roller 31 at a position corresponding to the reinforcing tape 57. Thus, it is possible to suppress the level of deflection of the roller 31 and suppress occurrence of moment. Furthermore, as shown in FIG. 10, if the center position between the inner edge Ain and the outer edge Aout is set to a position corresponding to the center position of the width of the reinforcing tape 57, a line of action of the force Fa matches a line of action of the force Fb. As a result, it is possible to eliminate a chance of occurrence of moment. Thus, it is possible to prevent the flange 63 from being removed from the roller 31 by suppressing and eliminating the occurrence of moment.

Figure 11:
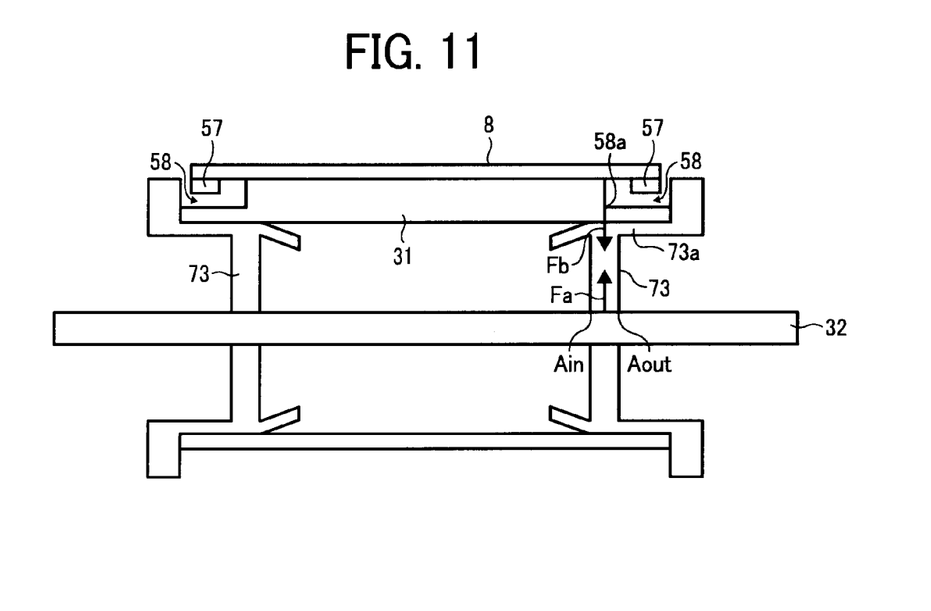
FIG. 11 is a schematic diagram of a flange in a belt unit according to a fifth embodiment of the present invention.

FIG. 11 is a schematic diagram of a flange 73 and a belt unit according to a fifth embodiment of the present invention. The fifth embodiment is based on the fourth embodiment. That is, a clearance groove 58 of the reinforcing tape 57 is formed on an outer periphery of each of end portions of the roller 31. The flange 73 is arranged in substantially the same manner as that in the third embodiment. The flange 73 is arranged such that an outer portion on a side of an outer periphery of the flange 73 from a cylindrical portion 73a is farther from the center position of the shaft 32 in the longitudinal direction than an inner portion on a side of an inner periphery of the flange 73 from the cylindrical portion 73a. Because the clearance groove 58 is arranged, a radial thickness of the outer portion is set to be substantially twice a radial thickness of the flange 73. Therefore, a center position between the inner edge Ain and the outer edge Aout is closer to the center position of the shaft 32 in the longitudinal direction than an inner edge 58a of the clearance groove 58. In the example shown in FIG. 11, the center position between the Ain and the Aout corresponds to a position of the inner edge 58a.

As described above, the reinforcing tape 57 is attached to the back surface of each of the side edges of the belt 8, the clearance groove 58 with a depth deeper than the thickness of the reinforcing tape 57 and with a width wider than the width of the reinforcing tape 57 is arranged on the outer periphery of each of the end portions of the roller 31, and the center position of the Ain and the Aout is closer to the center position of the shaft 32 in the longitudinal direction than the inner edge 58a of the clearance groove 58. Therefore, the flange 73 can support the force Fb applied from the inner edge 58a of the clearance groove 58 to the roller 31 at a position of the inner edge 58a. Thus, it is possible to suppress the level of deflection of the roller 31 and suppress the occurrence of moment. Furthermore, as shown in FIG. 11, if the position of the inner edge Ain corresponds to the position of the inner edge 58a, the line of action of the force Fa matches the line of action of the force Fb. Therefore, it is possible to eliminate the chance of occurrence of moment. Thus, it is possible to prevent the flange 73 from being removed from the roller 31 by suppressing and eliminating the occurrence of moment. According to the fifth embodiment, the clearance groove 58 is formed on the outer periphery of each of the end portions of the roller 31 by removing end portions of the roller 31. A groove can be formed easily by the above method; however, it is also applicable to directly form a concave groove and grooves in other shapes.

The above described image forming apparatuses are only examples and the present invention in its broader aspects is not limited to the specific details described in the embodiments. Thickness, shapes, and the like of the flange and the cylindrical portion can be changed and modified as appropriate within the spirit and the scope of the general inventive concept as defined by the appended claims and their equivalents. Furthermore, the endless belt can be a conveyor belt (direct transfer belt) that conveys a transfer sheet, a photosensitive element belt, and the like instead of the intermediate transfer belt described as an example in the embodiments. Moreover, the belt unit can be employed in other devices instead of the image forming apparatus.

As described above, according to an aspect of the present invention, the flange is configured to support the roller and the shaft with the outer periphery of the cylindrical portion and the inner periphery of the flange. Therefore, it is possible to suppress moment that is caused by a force applied from a supporting portion of the roller and the force applied from a supporting portion of the shaft and rotates the flange in a direction perpendicular to a direction of rotating the roller. Thus, it is possible to prevent the flange from being removed from the roller.

Furthermore, according to another aspect of the present invention, it is possible to form the flange with an even thickness.

Moreover, according to still another aspect of the present invention, it is possible to eliminate a chance of occurrence of moment. Thus, removal of the flange can be more effectively prevented.

Furthermore, according to still another aspect of the present invention, it is possible to suppress a deflection of the belt by using the flange to be rotated with the roller in an integrated manner. Moreover, even when the roller is deformed by the force applied from the flange, the level of noncontact between the side portions of the endless belt and the roller can be suppressed. Thus, it is possible to maintain the stable belt rotation. Furthermore, the amount of deformation by a force applied from the endless belt to the roller due to tension of the endless belt can be suppressed.

Moreover, according to still another aspect of the present invention, the roller is configured to contact with the reinforcing tape attached to the endless belt, and the flange can support the force applied from the endless belt to the roller at a position of the reinforcing belt. Therefore, it is possible to suppress the level of deflection of the roller and reduce the level of moment. Furthermore, the flange can support the force applied from the inner edge of the clearance groove to the roller at a position of the inner edge. Therefore, the level of deflection of the roller can be suppressed, the level of moment can be reduced, and the removal of the flange can be prevented. Moreover, it is possible to provide the image forming apparatus including the above belt unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A belt unit comprising:
an endless belt; and
a plurality of rollers supporting the endless belt, wherein
at least one roller of the plurality of rollers includes a flange arranged on an end portion of the roller,
the flange includes a cylindrical portion that is inserted into an opening portion of the roller at the end portion of the roller,
an outer circumference of the cylindrical portion makes contact with an inner circumference of the roller,
an inner circumference of the flange makes contact with a rotation shaft of the roller,
a first inner edge of a first surface where the flange is in contact with the rotation shaft is located on an inner side of a second outer edge of a second surface where the cylindrical portion is in contact with the roller in a longitudinal direction of the rotation shaft, and
the second outer edge of the second surface where the cylindrical portion is in contact with the roller is farther from a center position of the rotation shaft in the longitudinal direction of the rotation shaft than a first outer edge of the first surface where the flange is in contact with the rotation shaft.

2. The belt unit according to claim 1, wherein a first center position between the first inner edge and the first outer edge of the first surface is located on the inner side of the second outer edge in the longitudinal direction of the rotation shaft.

3. The belt unit according to claim 2, wherein the first center position is located at a position same as a second center position between a second inner edge of the second surface and the second outer edge in the longitudinal direction of the rotation shaft.

4. The belt unit according to claim 1, wherein an outer diameter of the flange is larger than an outer diameter of the roller.

5. The belt unit according to claim 1, wherein a position of a side edge of the endless belt is located at a position between the first inner edge and the first outer edge of the first surface in the longitudinal direction of the rotation shaft.

6. The belt unit according to claim 1, wherein the first inner edge is located on an inner side of a side edge of the endless belt in the longitudinal direction of the rotation shaft.

7. The belt unit according to claim 1, wherein
a reinforcing tape is attached to an inner surface of a side edge of the endless belt, and
a position of a first center position between the first inner edge and the first outer edge of the first surface is located at a position within a width of the reinforcing tape in the longitudinal direction of the rotation shaft.

8. The belt unit according to claim 1, wherein
a reinforcing tape is attached to an inner surface of a side edge of the endless belt,
a groove having a thickness thicker than a thickness of the reinforcing tape and a width wider than a width of the reinforcing tape is arranged on an outer circumference of the end portion of the roller, and the first inner edge is located on an inner side of an inner edge of the groove in the longitudinal direction of the rotation shaft.

9. An image forming apparatus comprising:
a belt unit that includes
an endless belt; and
a plurality of rollers supporting the endless belt, wherein
at least one roller of the plurality of rollers includes a flange arranged on an end portion of the roller,
the flange includes a cylindrical portion that is inserted into an opening portion of the roller at the end portion of the roller,
an outer circumference of the cylindrical portion makes contact with an inner circumference of the roller,
an inner circumference of the flange makes contact with a rotation shaft of the roller,
a first inner edge of a first surface where the flange is in contact with the rotation shaft is located on an inner side of a second outer edge of a second surface where the cylindrical portion is in contact with the roller in a longitudinal direction of the rotation shaft, and
the second outer edge of the second surface where the cylindrical portion is in contact with the roller is farther from a center position of the rotation shaft in the longitudinal direction of the rotation shaft than a first outer edge of the first surface where the flange is in contact with the rotation shaft.

10. The image forming apparatus according to claim 9, wherein a first center position between the first inner edge and the first outer edge of the first surface is located on the inner side of the second outer edge in the longitudinal direction of the rotation shaft.

11. The image forming apparatus according to claim 10, wherein the first center position is located at a position same as a second center position between a second inner edge of the second surface and the second outer edge in the longitudinal direction of the rotation shaft.

12. The image forming apparatus according to claim 9, wherein an outer diameter of the flange is larger than an outer diameter of the roller.

13. The image forming apparatus according to claim 9, wherein a position of a side edge of the endless belt is located at a position between the first inner edge and the first outer edge of the first surface in the longitudinal direction of the rotation shaft.

14. The image forming apparatus according to claim 9, wherein the first inner edge is located on an inner side of a side edge of the endless belt in the longitudinal direction of the rotation shaft.

15. The image forming apparatus according to claim 9, wherein
a reinforcing tape is attached to an inner surface of a side edge of the endless belt, and
a position of a first center position between the first inner edge and the first outer edge of the first surface is located at a position within a width of the reinforcing tape in the longitudinal direction of the rotation shaft.

16. The image forming apparatus according to claim 9, wherein
a reinforcing tape is attached to an inner surface of a side edge of the endless belt,
a groove having a thickness thicker than a thickness of the reinforcing tape and a width wider than a width of the reinforcing tape is arranged on an outer circumference of the end portion of the roller, and
the first inner edge is located on an inner side of an inner edge of the groove in the longitudinal direction of the rotation shaft.

17. A belt unit comprising:
an endless belt; and
a plurality of rollers supporting the endless belt, wherein
at least one roller of the plurality of rollers includes a flange arranged on an end portion of the roller,
the flange includes a cylindrical portion that is inserted into an opening portion of the roller at the end portion of the roller,
an outer circumference of the cylindrical portion makes contact with an inner circumference of the roller,
an inner circumference of the flange makes contact with a rotation shaft of the roller,
a first inner edge of a first surface where the flange is in contact with the rotation shaft is located on an inner side of a second outer edge of a second surface where the cylindrical portion is in contact with the roller in a longitudinal direction of the rotation shaft,
a first center position between the first inner edge and a first outer edge of the first surface is located on the inner side of the second outer edge in the longitudinal direction of the rotation shaft, and
the first center position is located at a position same as a second center position between a second inner edge of the second surface and the second outer edge in the longitudinal direction of the rotation shaft.

18. The belt unit according to claim 1, wherein the second outer edge and the first outer edge are both located outside of the endless belt.

* * * * *